United States Patent
Brocato et al.

(10) Patent No.: US 11,652,908 B2
(45) Date of Patent: May 16, 2023

(54) SPLIT TESTING WITH CUSTOM CACHE KEYS FOR CONTENT DELIVERY NETWORKS

(71) Applicant: Edgio, Inc., Phoenix, AZ (US)

(72) Inventors: Mark Brocato, Tallinn (EE); Ivan Erceg, Santiago (CL); Ishan Anand, Sammamish, WA (US)

(73) Assignee: Edgio, Inc., Phoenix, AZ (US)

( * ) Notice: Subject to any disclaimer, the term of this patent is extended or adjusted under 35 U.S.C. 154(b) by 0 days.

(21) Appl. No.: 17/693,307

(22) Filed: Mar. 11, 2022

(65) Prior Publication Data

US 2022/0294866 A1    Sep. 15, 2022

Related U.S. Application Data

(60) Provisional application No. 63/160,656, filed on Mar. 12, 2021.

(51) Int. Cl.
- *H04L 67/75* (2022.01)
- *G06F 16/955* (2019.01)
- *H04L 67/5682* (2022.01)

(52) U.S. Cl.
CPC ............ *H04L 67/75* (2022.05); *G06F 16/955* (2019.01); *H04L 67/5682* (2022.05)

(58) Field of Classification Search
CPC ... H04L 67/75; H04L 67/5682; H04L 67/568; H04L 67/5681; H04L 67/2885; H04L 45/306; H04L 47/20; G06F 16/955
See application file for complete search history.

(56) References Cited

U.S. PATENT DOCUMENTS

| | | | |
|---|---|---|---|
| 9,871,850 B1 * | 1/2018 | Brandwine | H04L 67/10 |
| 10,771,524 B1 * | 9/2020 | Long | H04L 67/568 |
| 11,218,561 B1 * | 1/2022 | Mondal | H04L 67/568 |
| 2011/0283355 A1 * | 11/2011 | Livshits | G06F 8/70 |
| | | | 709/224 |

* cited by examiner

*Primary Examiner* — Glenton B Burgess
*Assistant Examiner* — Rachel J Hackenberg
(74) *Attorney, Agent, or Firm* — Greenberg Traurig, LLP; Andrew J. Tibbetts

(57) ABSTRACT

Disclosed are systems and methods for enabling an application developer to define CDN behavior (e.g., caching rules) alongside an application program code and embedded in the same source code. The systems and methods can be used to define CDN or edge caching behavior using custom cache keys that go beyond simply using a URL. The custom cache keys and source code CDN behavior definitions can be used to enable a graphical user interface to specify traffic rules in a codeless interface. The described embodiments can be used for defining general traffic routing, to test different versions of the application or to otherwise present different versions of the application to end users, while preserving cache keys and caching behavior at the edge and throughout the application distribution layers.

20 Claims, 12 Drawing Sheets

```
// Example XDN routes file for a Next.js app const { Router } = require('@xdn/core/router')
const { nextRoutes } = require('@xdn/next')

export default nextJSApp => {
  return new Router()
    .get('/p/:productId', ({ cache }) => {
      cache({
        edge: {
          // cache the SSR response at the edge
          maxAgeSeconds: 60 * 60, // one hour
          staleWhileRevalidateSeconds: 60 * 60 * 24, // one day
        },
      })
    })
    .use(nextRoutes) // serve pages using Next.js's built-in routing
    .fallback(({ proxy }) => proxy('legacy')) // serve unmatched URLs from the legacy implementation of the site so we can gradually role out the new PWA page by page.
}
```

```
"destinations": {
  "default": {
    "index": 0,
    "routes": [
      {
        "path": "/__xdn__/cache-manifest.js",
        "routeJson": "{\"path\":\"/__xdn__/cache-manifest.js\"}",
        "match": [
          {
            "value": "${path}",
            "matchRegex": "(?i)^/__xdn__/cache-manifest\\.js[/#\\?]?$"
          }
        ],
        "cache": {
          "maxAgeSeconds": 31536000
        },
        "route": {
          "action": "proxy",
          "backend": "__js__"
        },
        "transform": {
          "request": [],
          "upstreamResponse": [
            {
              "action": "set-header",
              "name": "vary",
              "value": "accept-encoding"
            }
          ],
          "response": [
            {
              "action": "set-header",
              "name": "cache-control",
              "value": "private, max-age=3600"
            },
            {
              "action": "set-header",
              "name": "content-type",
              "value": "text/javascript"
            },
            {
              "action": "set-header",
              "name": "Access-Control-Allow-Origin",
              "value": "*"
            }
          ]
        }
      }
    ]
  },
```

FIG. 3

Add Rule

Criteria

| Device ▼ | ☐ Phones ☐ Tablets ☐ Desktops | | | ✕ |

| Header ▼ | Header name | matches | / value /i | ✕ |
| | | | Regular Expression | |

| Query Param ▼ | Query parameter name | matches | / value /i | ✕ |
| | | | Regular Expression | |

| Path ▼ | For example:<br><br>/:splat*<br>/p/:id<br>/checkout/:splat* | | | ✕ |

List each path on a separate line. Use XDN route pattern syntax

| Cookie ▼ | Cookie name | matches | / value /i | ✕ |
| | | | Regular Expression | |

| IP Address ▼ | For example:<br><br>1.2.3.4<br>123.0.0.0/8 | | | ✕ |

List each IP address or range on a separate line

| Browser ▼ | ☐ Chrome ☐ Safari ☐ Edge ☐ IE ☐ Firefox ☐ Other | ✕ |

| Bot ▼ | ○ Bot ● Not a bot | ✕ |

[ADD CRITERION] Request must match [ all ▼ ] of the criteria

Destination(s)

| 50 % | current environment ▼ | ✕ |
| 20 % | default environment ▼ | ✕ |
| 030 % | current environment ▼ | ✕ |

[ADD DESTINATION]

FIG. 7

SPLIT TESTING WITH CUSTOM CACHE KEYS FOR CONTENT DELIVERY NETWORKS

CROSS REFERENCE TO RELATED APPLICATIONS

This application claims the benefit of U.S. Application No. 63/160,656, filed Mar. 12, 2021, which is hereby incorporated by reference in its entirety.

FIELD

This application relates generally to the field of content delivery networks and in particular to directing traffic using cache keys and/or cache key policies for split testing or for generally defining traffic rules in a web or internet application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Various techniques for caching content in an edge computing network exist. These approaches are typically applied to static content, where it is relatively easy to determine the cache policy (e.g., the rules and logic that determine the conditions under which a cached response is or is not served for a response). However, in practice, edge computing and caching can extend numerous opportunities for speed and performance optimization that existing caching techniques do not provide. The described technology provides methods and systems that can more efficiently cache content, data and/or functionality in an edge or CDN environment to optimize and improve the responsiveness of applications served on these networks.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

FIG. 1A illustrates an example excerpt of CDN-as-programming language written in a compatible content delivery platform.

FIG. 3 illustrates a sample intermediary routing file generated according to an embodiment.

FIG. 7 illustrates an example graphical user interface page available to an operator of the application utilizing the cache system and the CDN-as-a programming language of the described embodiments.

DETAILED DESCRIPTION

Figure 1B:
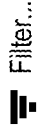
FIG. 1B illustrates a metric page according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

A content delivery network (CDN) refers to a geographically distributed group of servers which work together to provide fast delivery of Internet content. A CDN allows for the quick transfer of assets needed for loading Internet content including HTML, pages, JavaScript files, stylesheets, images, and videos. CDNs are geographically distributed network of proxy servers and their data centers, with the goal of providing high availability and performance by distributing the service spatially relative to end users. CDNs can include nodes that are deployed in multiple locations, often over multiple internet backbones. Benefits can include reducing bandwidth costs, improving page load times, or increasing global availability of content. The number of nodes and servers making up a CDN varies, depending on the architecture, some reaching thousands of nodes with tens of thousands of servers on many remote points of presence (PoPs). Others build a global network and have a small number of geographical PoPs.

Requests for content or functionality are typically algorithmically directed to CDN nodes that are optimal in some way. When optimizing for performance, locations that are best for serving content to the user may be chosen. This may be measured by choosing locations that are the fewest hops, the lowest number of network seconds away from the requesting client, or the highest availability in terms of server performance (both current and historical), so as to optimize delivery across local networks. When optimizing for cost, locations that are least expensive may be chosen instead. In an optimal scenario, these two goals tend to align, as edge servers that are close to the end user at the edge of the network may have an advantage in performance or cost.

Some CDN providers will provide their services over a varying, defined, set of PoPs, depending on the coverage desired, such as United States, International or Global, Asia-Pacific, etc. These sets of PoPs can be called "edges", "edge nodes", "edge servers", or "edge networks" as they would be the closest edge of CDN assets to the end user.

Content Delivery Networks can augment an end-to-end transport network on the internet by distributing on it a variety of intelligent applications employing techniques designed to optimize content delivery. The resulting tightly integrated overlay uses web caching, server-load balancing, request routing, content services and other technologies to optimize content delivery. For example, Web caches store popular content on servers that have the greatest demand for the content requested. These shared network appliances reduce bandwidth requirements, reduce server load, and improve the client response times for content stored in the cache. Example web caching technologies include web caching populated based on requests from users (pull caching) or based on preloaded content disseminated from content servers (push caching).

Another CDN optimization technology, server-load balancing uses one or more techniques including service-based (global load balancing) or hardware-based (e.g., layer 4-7 switches, also known as a web switch, content switch, or multilayer switch) to share traffic among a number of servers or web caches. Here, the switch is assigned a single virtual IP address. Traffic arriving at the switch is then directed to one of the real web servers attached to the switch. This has the advantage of balancing load, increasing total capacity, improving scalability, and providing increased reliability by redistributing the load of a failed web server and providing server health checks. A content cluster or service node can be formed using a layer 4-7 switch to balance load across a number of servers or a number of web caches within a network.

Another optimization technology in CDN is request routing, which can direct client requests to the content source best able to serve the request. This may involve directing a client request to the service node that is closest to the client, or to the one with the most capacity. A variety of algorithms are used to route the request. These can include Global Server Load Balancing, DNS-based request routing, Dynamic metafile generation, HTML, rewriting, and anycasting. Proximity—choosing the closest service node—can be estimated using a variety of techniques including reactive probing, proactive probing, and connection monitoring. CDNs can use a variety of methods of content delivery including, but not limited to, manual asset copying, active web caching, and global hardware load balancers.

Edge computing is a technology that evolved from CDNs and is also a distributed computing paradigm that brings computation and data storage closer to the location where it is needed, to improve response times and save bandwidth. Edge computing networks have evolved to host applications and application components at the edge servers, resulting in commercial edge computing services that host applications such as dealer locators, shopping carts, real-time data aggregators, ad insertion engines, and many other web applications. Additionally, virtualization technology has made it easier to deploy and run a wider range of applications on edge servers to realize the benefits of CDNs.

CDNs and edge computing networks are also closely related to cloud computing and cloud computing networks. Cloud computing can provide the on-demand availability of computer system resources, especially data storage (cloud storage) and computing power, without direct active management by the user. Large clouds, predominant today, often have functions distributed over multiple locations from central servers. If the connection to the user is relatively close, it may be designated an edge server. Clouds may be limited to a single organization (enterprise clouds) or be available to multiple organizations (public cloud). Cloud computing relies on sharing of resources to achieve coherence and economies of scale. Cloud providers typically use a "pay-as-you-go" model, which charge users based on the resources they employ on a provider's platform. Cloud computing also utilizes hardware virtualization, service-oriented architecture, and autonomic and utility computing to provide their services.

One definition of edge computing can be any type of computer program that delivers low latency nearer to the requests. Similarly, edge computing can broadly be defined as all computing outside the cloud happening at the edge of the network, and more specifically in applications where real-time processing of data is required. In his definition, cloud computing operates on big data while edge computing operates on "instant data" that is real-time data generated by sensors or users. In some cases, edge computing concentrates on servers in close proximity to the last mile network. While more upstream servers handling data, content and/or functionality are more appropriately handled in cloud computing networks.

In the context of delivering services, data, information, content over the internet and CDNs, there are various actors and subsystems that the actors control. For example, an application developer may write the computer code that defines the behavior, appearance and processes of the application. For example, an e-commerce website developer can write the website code in JavaScript or other programming language and define the appearance of the website, the paths, the application wireframes, and the user interface. The developer may also define how the e-commerce website is to interface with an inventory system, a checkout system and one or more databases that maintain customer information or marketing-related data. In the case of more advanced, enterprise-scale e-commerce websites, several developers may be involved in defining and coding various parts of the e-commerce website. For example, a frontend developer may be responsible for the UI appearance and wireframing of the e-commerce website, while one or more backend developers can be responsible for interfacing the e-commerce website to inventory and checkout systems. Besides developers, there may be additional actors that can control the functioning and appearance of an e-commerce website. For example, sales managers and marketing executives can also provide input and indirectly control the behavior of an application, such as an e-commerce website.

Typically, if an application developer wants to take advantage of CDN and edge computing to optimize and speed up their application's web presence, they can use a control panel, provided by the CDN provider. In other words, the developer writes the application code separately and almost with no or minimal consideration of how the CDN is to optimize the application web presence. Of course, control panel functionality may be a one-size-fit-all with predetermined parameters that may or may not be applicable to the application developer. CDN control panels can be used to define parameters, such as zoning and caching behavior. While CDN control panels can be custom-coded based on the needs of an application developer to provide more tailored functionality and parameters, they are nonetheless essentially separate systems than the applications they serve. In other words, the application and the CDN are not synced. Changing the application behavior does not automatically change the behavior of CDN, without technical, human input into the control panel. This is at least partly due to the historical basis that CDNs did not run application code, and were thus separated from the systems which ran application code. The present invention seeks to address such issues, as the systems and methods herein tie both the server hosting and the CDN entities together into a single functional platform.

Another method by which application developers can use CDNs is cache-control headers. HTTP headers let the client and the server pass additional information with an HTTP request or response. An HTTP header consists of its case-insensitive name followed by a colon (":"), then by its value. General headers apply to both requests and responses, but with no relation to the data transmitted in the body. In one respect, cache-control headers technique is an HTTP standard that tells browsers and CDNs when a resource is cacheable and for how long. However, Cache-Control headers and other HTTP standards are unable to specify the full range of typical cache optimization tasks that can provide greater optimization. Examples of such tasks include, ignoring query parameters or optimizing a cache key to include/exclude parts of a cookie (often used for personalization and internationalization).

Some CDNs support running code in Varnish Configuration Language (VCL), JavaScript, Web Assembly (WASM), or other computing languages, which an application developer can utilize at the edge to define the CDN behavior, such as the CDN caching behavior. This custom code can control parts of the caching process and the CDN behavior. However, this still creates a "second system" that must be maintained apart from the application where caching and CDN rules need to be manually propagated and maintained over time.

Despite the limitations described above, these techniques can be sufficient for caching static website assets, such as images and JavaScript files, because these resources can have simple caching requirements that rarely change. Caching dynamic data (e.g. the HTML and API data) at the edge is more difficult because the content can vary based on multiple variables, including some query parameters (but not others), header and cookie values, GraphQL post request body content, traffic splitting probabilities, dictionary values, and many others. Computing at the edge is required to cache these types of data and bring them closer to visitors to create a fast, reliable experience. Incidentally, serving cached responses can also save the application operator (CDN customer) money because it can "shield" traffic to the deeper, more costly, less scalable layers of the cloud, such as serverless computing, traditional servers, and databases.

As used throughout, one subset of "static" and "dynamic" data, assets, pages, or content can be usefully differentiated from one another relative to a developer's perspective. That is, will the developer be aware that a particular piece of content will not change from one deployment to another, but will remain reliably fixed? If so, then the content is static in nature. On the other hand, if the developer is aware that the content may be subject to change or modification upon deployment, then likely the developer is also aware that some code or logic must be implemented to handle the post-deployment changing of the content. Such content can be considered dynamic in nature. Other subsets of "dynamic" data which can be contemplated throughout include data, assets, pages, or content which are personalized, customized, or unique to a particular user's experience (e.g., content which is personalized with a particular user's details such as their name or language preferences), or to the experience of a particular group or class of users (e.g., premium users may see a different webpage than non-premium users). Other forms of dynamic data may be contemplated as well.

To enable the serving of cached responses, some CDN vendors have added edge computing capabilities through JavaScript, VCL, WASM, or APIs, yet even with these technologies, many sites rarely cache dynamic data, such as eCommerce catalog data. This in some cases is because the parameters of the application changed by application developer or application operator affect CDN behavior, such as caching, but are not automatically propagated to various layers of the CDN to sync its behavior. For example, the frontend developer determines what can and cannot be cached, which parameters and cookies change the cached content and which do not, and how to break web pages into various parts, yet CDNs may not have or provide direct syncing with the application for frontend developers to program or otherwise configure in relation to the application program code.

Furthermore, edge computing may have no awareness of the web app code and does not work within the web developer's workflow. Consequently, CDN and edge configuration have historically been managed by DevOps and backend teams. In these environments, edge configuration is manually synchronized across the edge control panel, the frontend code, and the backend code. Each of these are different systems with divergent management interfaces— CDNs are often controlled via a control panel and rules engine, whereas applications are written in a computer programming language, such as JavaScript. Given the high-risk of site breakage and overhead of synchronizing application changes to edge configurations, many frontend teams simply forgo caching of dynamic data, which can cost their companies money in extra spending on computing and lost conversions.

The described embodiments include methods and systems which can provide a programming language (with or without a graphical user interface), which can be used to define CDN behavior in the same programming language in which an application utilizing the CDN is written. In other words, the CDN rules (such as caching) can be embedded in the application program code. For example, if the application running on the CDN is written in JavaScript, the described embodiments provide a CDN-as-JavaScript language enabling the application developer to define and embed the CDN behavior in the application code. Furthermore, the described embodiments utilize a CDN-as-programming language to define a delivery platform and network (XDN), operable on an edge computing network, which can interface with existing CDNs, clouds and edge computing networks to deliver internet content and services. The XDN can also host and/or maintain at least some of the application code, in particular the "backend" code which implements backend processes for the frontend of the application. Such backend code is configured to run on the server side in order to support the frontend for tasks such as, e.g., server side rendering and API orchestration and/or aggregation.

CDN-as-programming language (e.g., CDN-as-JavaScript) provides simpler control of the edge for frontend web and application developers. For example, routing logic can be defined once, natively in the application's routes.js file or equivalent, not separately in an Edge worker or CDN control panel. With local and cloud emulation of the CDN, these CDN-as-JavaScript rules are more convenient and reliable because they go through the local development to pull request to pre-production to release's cycle as a native part of the application code.

CDN-as-JavaScript makes previously painstaking-to-implement tasks, such as cache key optimization, easier to deploy. Further, it unlocks new capabilities such as predictive prefetching and performant split testing (e.g., AB testing) while dramatically reducing setup time and maintenance. In addition, CDN-as-programming language makes a platform "application aware," which can allow the platform to offer dashboards that specify controls and metrics in terms of the application's routes (e.g., "/p/:productid" or "all product pages") rather than a jumble of URLs (e.g., "/p/1", "/p/2", . . . etc. which can have separate metrics). In addition, the edge typically only exists within a cloud architecture, and thus it is difficult for developers to develop for the edge locally or across particular staging environments.

In some embodiments, CDN-as-programming language (e.g., CDN-as-JavaScript) enables developers to manage the edge in their application code. It gives developers a central part of their application code that they write, for example, once, and then all other systems including the edge, frontend code, backend code, and service worker automatically inherit a unified CDN behavior (such as caching behavior). CDN-as-programming language also allows developers to emulate caching logic locally. And because the caching profile can live in the application code, it "atomically" propagates with the code through the software development life cycle, through local development, staging, Q/A, production release and even rollbacks. The system also automatically understands the routing of popular frameworks, such as JavaScript frameworks like Next.js and Nuxt.js, and can propagate their rewrites and redirection rules to the edge. Finally, CDN-as-programming language can include an easy-to-use dashboard that lets developers understand the caching metrics in terms of their application's routing instead of a confusing jumble of URLs.

As used throughout, "atomic" deployment refers to when the application behavior, as viewed by an end user or observer, appears as a single unified application and experience, regardless of the current state of the system potentially not being unified, e.g., being distributed across multiple versions, layers of the system, servers, etc. For example, an application may consist of front-end code, edge logic, and back-end code. When a developer deploys this application, each of these components runs in a different layer of the system. In addition, the system may have multiple versions of the application (e.g., version 1, version 2, version 3). As a result, the system would have multiple versions in each layer of its corresponding application components, e.g., front-end code version 1, front-end code version 2, front-end code version 3, edge logic version 1, edge logic version 3, etc. "Atomic" deployment ensures that the observed behavior of the application to any observer appears as a single version, i.e., a user will only get the experience corresponding to front-end code version 1 with edge code version 1 and back-end code version 1, such that all the versions correspond to one another. In no case under an atomic deployment would a user experience the result of executing components with a different version, i.e., front-end code version 1 with edge-logic version 2.

FIG. 1A illustrates an example excerpt 102 of CDN-as-programming language written in a compatible content delivery platform (e.g., XDN). An application developer can use CDN-as-programming language (e.g., CDN-as-JavaScript) to describe CDN rules in a path file of the application (e.g., in routes.js if JavaScript is used). The excerpt programming code shown in FIG. 1 is an example path or routes file (routes.js for an application built on the Next.js framework.

In the example shown in FIG. 1A, the application developer can utilize CDN-as JavaScript, in coordination with a developer-specified application framework, to specify various CDN behaviors, such as caching, routing, and fallback routing. For example, the excerpt code illustrated in FIG. 1A describes a caching behavior defined by the specified application framework, where Responses to HTTP GET requests with paths matching the routing pattern /p/:productId are configured by the application framework to be cached at the edge for one hour and to use the stale-while-revalidate protocol with a max stale age of one day. The /p/:productId is a routing pattern syntax, whereby the "productId" represents a variable path parameter in the URL. Notably, this caching behavior can be defined in an application code. The excerpt code in FIG. 1A also includes the application routing in a CDN, where, for example, the Next.js framework has built-in conventions for redirects and routing. For example, if there is a file called foo.js in the /pages directory, then, using the described embodiments, Next.js can automatically create a path on an application site, as www.example.com/foo that would execute foo.js when responding to that path. The .use(nextRoutes) call can automatically propagate the built-in routes and redirects created by the framework to the edge/CDN network. This can also automatically allow the XDN platform, and the tooling embedded therein, to understand the pages in terms of the application's routes instead of URLs. For example, the XDN platform can include Developer tools and cache metrics page 104, shown in FIG. 1B, where the results are in terms of the application's routes as opposed to URLs.

Furthermore, the excerpt code illustrated in FIG. 1A illustrates that an application developer can specify fallback routing. For example, the last line describes that any URLs that do not match a known route specified in the CDN-as-JavaScript (either explicitly in the example file or implicitly via use(nextRoutes)) should go to a "legacy" system. This can be useful, for example, when gradually migrating a site to Next .js (or similar framework) and some parts of the site are still not migrated. Fallback routes like this can allow the CDN-as-JavaScript to direct requests to the new version of the application or the old legacy system.

Figure 2:
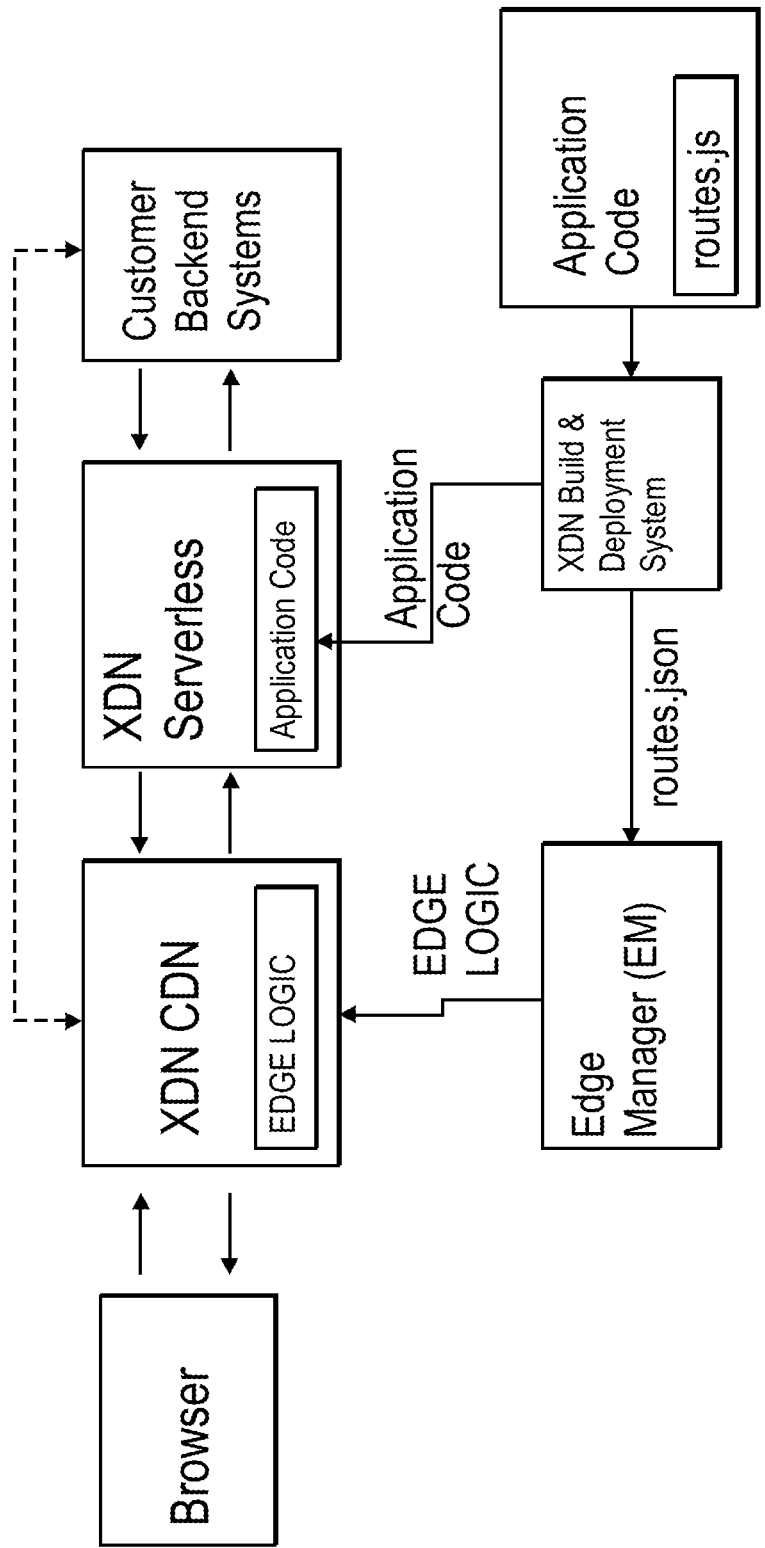
FIG. 2 illustrates an implementation example of CDN-as a programming language.

FIG. 2 illustrates an implementation example of CDN-as a programming language, described in the context, where the programming language is JavaScript. The described system can be used for production traffic of a web site, a web application or other application deployed on the content delivery platform utilizing CDN-as a programming language (e.g., XDN). Some CDNs and their associated infrastructure do not interface via JavaScript and may use a more limited programming language, such as VCL. In that scenario, CDN-as-JavaScript can be translated into VCL.

When an application is built and deployed to the XDN, the application path file (e.g., the routes.js file is translated into a declarative intermediate representation referred to as the routes.json. This intermediate representation contains a list of rules that capture the behavior specified in the CDN-as-JavaScript API, such as transformations, cache key manipulations, etc. An example snippet from a routes.json is shown in FIG. 3.

While some parts of the code snippet shown in FIG. 3 are recognizable such as the cache key timings and header values, the routes.json format illustrated therein is intended for machine translation. For example, the code snippet shown in FIG. 3 is the excerpt that can be generated for a single route and would correspondingly occupy only a single line of CDN-as-JavaScript in the application code. An edge manager (EM) can translate this routes.json into edge logic (e.g., VCL code) and then the XDN system can deploy both the application CDN logic and the application code atomically to a CDN and/or cloud computing network as the case may be. The EM can include or be implemented via a module, library, or server, which can manage the configuration of the underlying CDN servers. Furthermore, in the case of a customer roll-back, both layers (CDN logic and application code) are also rolled back atomically. In FIG. 2, an XDN-compatible CDN and serverless (e.g., cloud computing network) are shown. However, additional layers may also be present.

As used throughout, "logic" can refer to, e.g., rules, instructions, policies, and/or contractual relationships between components which control, stipulate, define, and/or constrain behavior in some way. The term "logic" is not used to describe or suggest Turing completeness within any system or component herein, nor does it describe discrete math or discrete logic in a classical or traditional sense. Rather, it describes rules or instructions for components which can be language-like or can be specified by a language, data format, or other sophisticated representation of data and behavior (such as, e.g., JSON). Such rules and instructions can have, for example, variables which are instantiated and deployed, as well as operations which can take into account various contexts or situations and react accordingly.

In one embodiment, the application code (e.g., a backend for frontend or BFF code) is received in an XDN build and deployment system, which can send the application code to the serverless layer. As described earlier, if CDN is not compatible with the programming language used in the application source code, an EM can translate the CDN logic embedded in the application program source code to an intermediary programming language compatible with the CDN and deploy the same to the CDN and the serverless network. In this manner, the CDN logic and the application code are synced and shared across various layers, including the CDN, the serverless or edge computing network if used. In some embodiments, the XDN build and deployment system extracts a path file from the application code (e.g., the routes.json) and sends the same to the EM. The EM can use the path file to translate the CDN logic and/or optimization algorithms to a programming language compatible with the CDN. In this manner, the CDN logic and the application code are synced and shared across various layers, including the CDN, the serverless or edge computing network if used. In some embodiments, the XDN CDN shown in FIG. 2 can be an edge computing network. In some embodiments, the CDN may be enabled to be compatible with the programming language of the application code and EM may be optional.

In another aspect, FIG. 2 illustrates the content delivery system (e.g., XDN) sitting between an end user browser, and a customer backend system. The customer can purchase the XDN services to make its web presence more optimized and to utilize CDN, edge computing and cloud computing more efficiently. The customer provides the application code in a source code programming language, such as JavaScript. Notably, the application code can include CDN programming and logic written in the same code language in which the application code is written and embedded in the application code just like any other part of the application code. For example, an application code written in JavaScript can include CDN logic written in JavaScript and embedded in the application code. The application code can be or can include backend for frontend (BFF) code.

Figure 4:
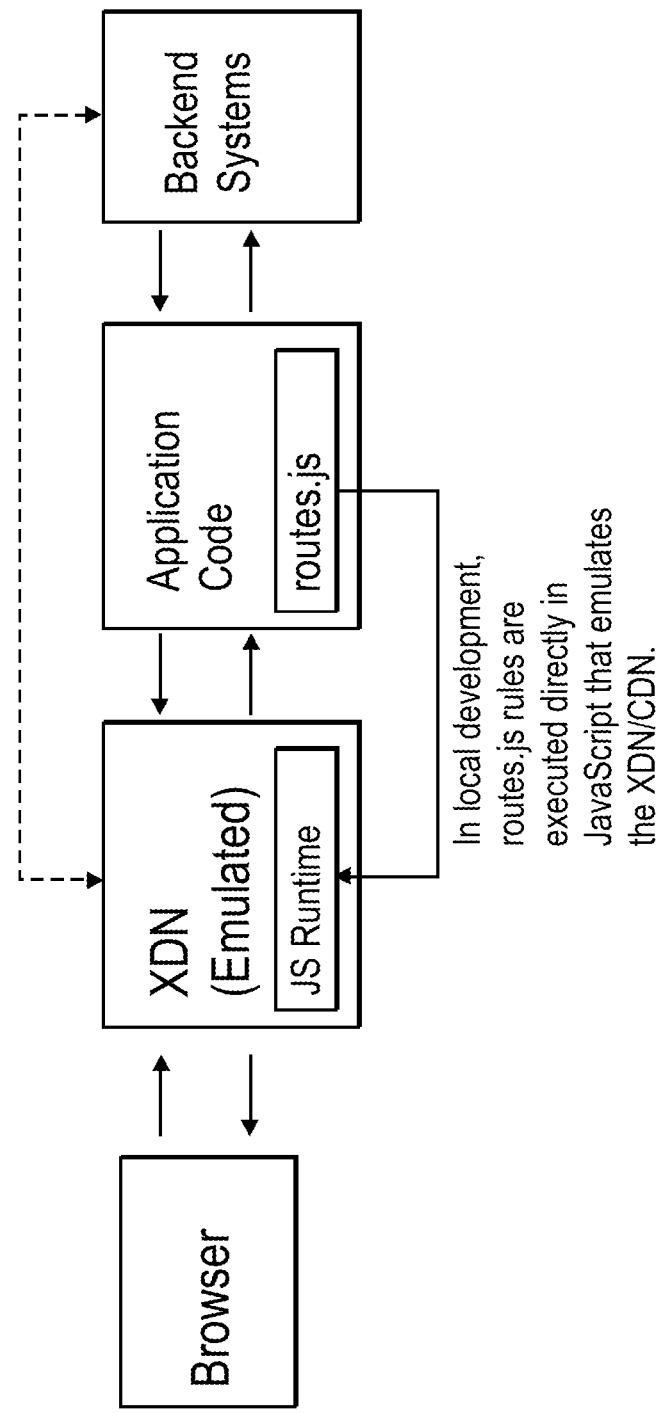
FIG. 4 illustrates a diagram of the JavaScript runtime, which can be used during development to emulate the CDN.

FIG. 4 illustrates a diagram of the JavaScript runtime, which can be used during development to emulate the CDN and the CDN-as-JavaScript when no real CDN exists (e.g., during local development or in the cloud when a real CDN or selected CDN is not yet available. In the JavaScript runtime case, the CDN-as-JavaScript API can be implemented in raw JavaScript/Typescript. This implementation can emulate the behavior of the CDN-as-JavaScript including caching and storing requests. However, in the case of CDN infrastructures that support the application code programming language (e.g., JavaScript), parts of the JavaScript runtime may be used in production.

The described embodiments of content delivery networks (such as XDN) and CDN-as a programming language can provide a variety of tools to developers and customers using the described delivery networks. For example, an operator of an application running on an XDN can efficiently perform split testing, where traffic to the application (e.g., website) is directed to various versions of the application and/or various parameters of interest are tested via directing traffic.

One way, CDNs can speed up the responsiveness of websites and web applications is to cache content, data, functionality, or generally computing resources at a node closer to where they might be needed. Caching generally involved use of cache keys and cache policies. The below embodiments can use cache keys in the context of split testing. Split testing is used when an application developer or operator tests different versions of the application by directing traffic selectively to two or more versions of the application. AB testing is an example of split testing where two versions of an application are tested.

Figure 5:
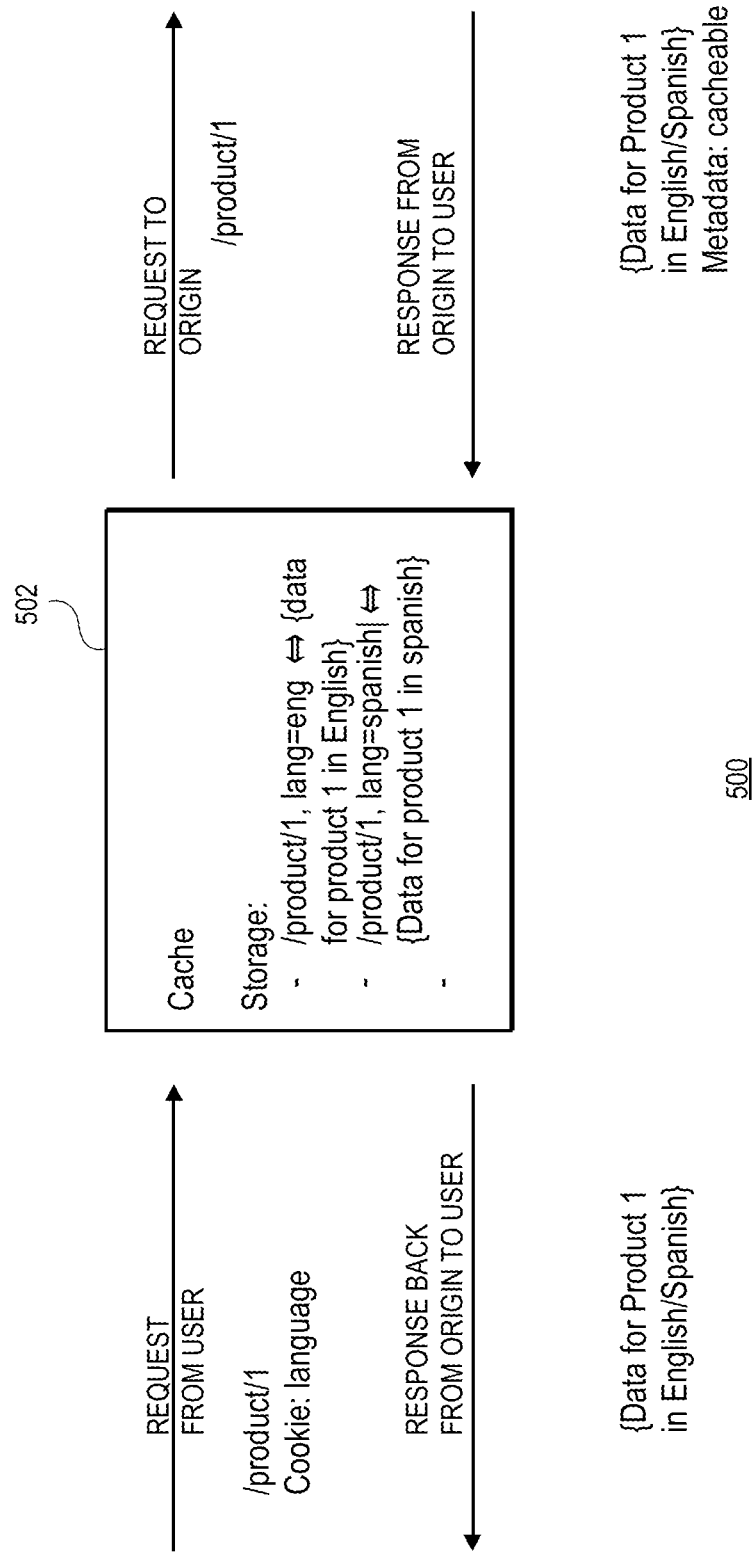
FIG. 5 illustrates a diagram of caching behavior in a CDN.

FIG. 5 illustrates a diagram 500 of caching behavior in a CDN. A request from a user for content, data or functionality is received at the edge 502 of a computing network. The edge 502 can be a node of a CDN close to the user making the request and can include an edge server, a collection of servers, nodes or other computing resources at the edge of a computing network that receives and responds to requests from users. User requests can be HTTP requests, API requests or any other request for content, data, functionality over the internet. The edge 502 maintains one or more cache storages (e.g., Storage A and B), the contents of which are determined based on the cache policy upon which the edge 502 operates. Therefore, the edge 502 and its computing resources can maintain one or more environments corresponding to one or more cache policies.

Additionally, many possibilities can be contemplated for the variety of operations which the system may perform with respect to the request and/or response. For example, the system may perform one or more operations with respect to headers and/or cookies, including, e.g., setting, updating, or removing a response header; adding, updating, or removing an upstream response cookie; or adding, updating, or removing a response cookie generally; setting, updating, or removing a request header; adding, updating, or removing an upstream request cookie; or adding, updating, or removing a request cookie generally. The system may also, e.g., forward a request to a same path as a backend or a different path, cache proxied requests at the edge, proxy to different backends based on different host names, serve static files, fall back to server side rendering, serve a custom "404" page, redirect or block traffic, and whitelist specific IP addresses.

In some cases, the request from the user can include a URL, for example a request for a product page from an e-commerce website (e.g., site.com/product/1). In this scenario, a cache key identical to the URL or based on the URL can be used to define a cache policy and the contents in the cache storages. The cache storages maintained at the edge 502 can be indexed and searchable based on a plurality of cache keys. When the edge 502 receives a user request, it searches its cache storage based on the plurality of cache keys to determine if the request can be serviced with what exists in the cache. If the request cannot be serviced with the cache, the edge 502 forwards the request to a point upstream, where the request can be serviced. The point upstream can be another node in the edge, a serverless network, a cloud network, or the origin server (e.g., the e-commerce server). The point upstream sends a response back to the edge 502, which is responsive to the user request. In some cases, the point upstream can send the response along with metadata containing caching instructions to the edge 502. For example, the metadata can indicate the user response includes cacheable content, data, functionality, which the edge 502 should cache henceforth. The edge 502 can forward the response to the user and execute the embedded caching instructions.

For subsequent user requests, the edge 502 can find the cached content, data, or functionality (as a result of a previous request) and serve that to a relevant request. As described earlier, the searching of the cache is based on the cache key.

In some cases, the URL as cache key may not be enough to give an application developer flexibility in defining caching behavior and to fully take advantage of optimization possible at the CDN when more granular caching policies are available. For example, the user may be in a geographical location, where a different language is spoken. In the context of e-commerce product pages, it may be advantageous to cache the same content/product pages in various languages. Besides language, other parameters may be of interest and/or related to caching policy at the edge. These can include user currency, user region, or other user-based cache policy customization. For example, users can be categorized based on various criteria and directed to different caching environments. An e-commerce operator may select to send different product pages in response to user requests, based on a user category derived from prior expenditure patterns. For example, VIP users may be served product pages with more premium items, compared to less frequent shoppers. In these cases, the desired data for basing caching policy is not entirely contained in a URL, therefore, custom cache keys based on additional metadata can be used. In some cases, the additional data to base a cache policy can be found in user cookies. In other words, a cache policy can be defined, not only based on URLs, but also based on additional metadata in cookies.

In some cases, one or more values in a user cookie can directly become cache keys upon which one or more cache policies can act. For example, a cookie called "user_language_preference") can directly yield several cache keys based on various available languages. In other cases, the cookies can further be partitioned, where cache keys are derived and defined based on an analysis of the values of one or more cookies. This can be termed custom cache key generation based on cookie partitioning. For example, in the case of categorizing users based on previous shopping patterns, a cookie can be partitioned into various cache keys and sub-cache keys based on one or more frequency parameters embedded in the one or more cookies. Subsequently, the different cache keys derived from partitioned cookies can be used by a single cache policy or be routed to different cache policies.

Another flexibility afforded to the users of the CDN and the CDN operators by availability of custom cache keys is cache key normalization, which refers to adding or subtracting parameters from a user request to streamline the caching behavior and more precisely define caching policies based on parameters that matter. For example, a user request in the form of a URL can include a variety of query parameters, which bear no relation or minimum relation to the goals of caching and application response optimization. When a user request, such as a URL is directly used as cache key, without further customization, the likelihood of future cache hits based on that cache key is reduced because few future requests would contain the extraneous data that for a variety of reasons were present in the original user request (e.g., URL). For example, in the case of user requests containing URLs, it is common to encounter a long string of text, with only few characters relevant to caching behavior. The bulk of the URL in these cases can be marketing material, such as where or how the request was generated, the particular platform from which it came from (e.g., social media, marketing campaign, etc.). This can mean every time a user clicks on a URL, a different URL is generated and sent to the CDN. Such marketing material is used in the marketing analytics module on the application server but has little or no relevance to caching policy and improving the speed and responsiveness of the application. Typical CDNs have no way of determining that the received URLs are requesting the same content, data, functionality because they do not have any information on the structure of the data they receive.

The ability to define custom cache keys (not entirely based on URL) allows the cache key to be generated with the relevant caching parameters and ignoring extraneous material. The described embodiments enable a CDN-as programming language line of code that can define selected caching parameters via affirmative declaration or via blacklist or filter-out lists. For example, in CDN-as a programming language the following lines of code can define a cache key that ignores all query parameters in a URL, except the skuID, which in the case of an e-commerce application, uniquely identifies a product page:

```
Edge: {
    Key: new CustomCacheKey ( )
    .excludeAllQueryParametersExcept('skuID')
```

In another example, the exclusion line of code can include language or any other customization parameters based on which a cache key could be defined. For example, .excludeAllQueryParametersExcept ('skuID' and 'lang') would exclude all query parameters except skuID and language. In other words, the described embodiments can define custom cache keys based on selected parameters that may be found in cookies, URLs or other main or metadata found in a user's request. Furthermore, this cache key definition is available to the application developer and can be embedded in the same code in which the application program code is written.

One way to do split testing in the embodiment of FIG. 5 is to dedicate different cache storages and/or cache policies to the different variants in a split test. Users are cookied to the various caching storages and/or policies. Each of the different variants and associated cache environments and policies share the same cache key logic with the addition of the cookie data indicating which variant the user belongs to. When a request is received, the cookie data is used to determine which caching environment should be searched to respond to the user request. In this scenario, the cached content, data or functionality could be selected to be the same in various caching policy environments, but different versions of the application are tested, or conversely the caching policy could be different between the variants and the application code is identical, or both the caching policy and application code could be different between the variants.

In some embodiments, each source code within a split test can be executed in separate environments. Each environment can contain a collection of special variables called environment variables where the names of the variables are the same in some or all of the environments, but the values can be different in each environment. In this case, the variables are instantiated with values that are unique to that environment within the source code. This allows multiple different outputs from different versions to be obtained by running a single source code with different values being instantiated for different environment variables which correspond to the divergences between different versions.

In some embodiments, cache policies can be specified via the HTTP Vary header, where the header in a request can include an instruction to incorporate other HTTP headers in the cache key. For example, HTTP headers from the device can identify to the CDN what format of data to serve, based on the device making a request and what data formats a device can handle. For example, if the browser supports compressed data formats like gzip, the browser will indicate that in the "Accept" header of the request and the server would tell the CDN to use the "Accept" header as part of the cache key. One disadvantage of using HTTP Vary headers for caching is that such caching methods cannot reach the metadata in the cookies in the headers with a degree of granularity, which as described above can be highly relevant to a robust caching system. In other words, because cookies can be single headers, it becomes difficult or impractical to use them for custom cache keys with the level of granularity described above. For example, a typical cookie header can include 10 or 20 cookies in it, including those that may or may not be relevant to caching. For example, a cookie header can include session ID as well as language and currency preference. In some cases, the session ID is irrelevant to caching and a robust caching system would not generate separate cache keys for content, data or functionality that is the same, but for session ID.

Figure 6:
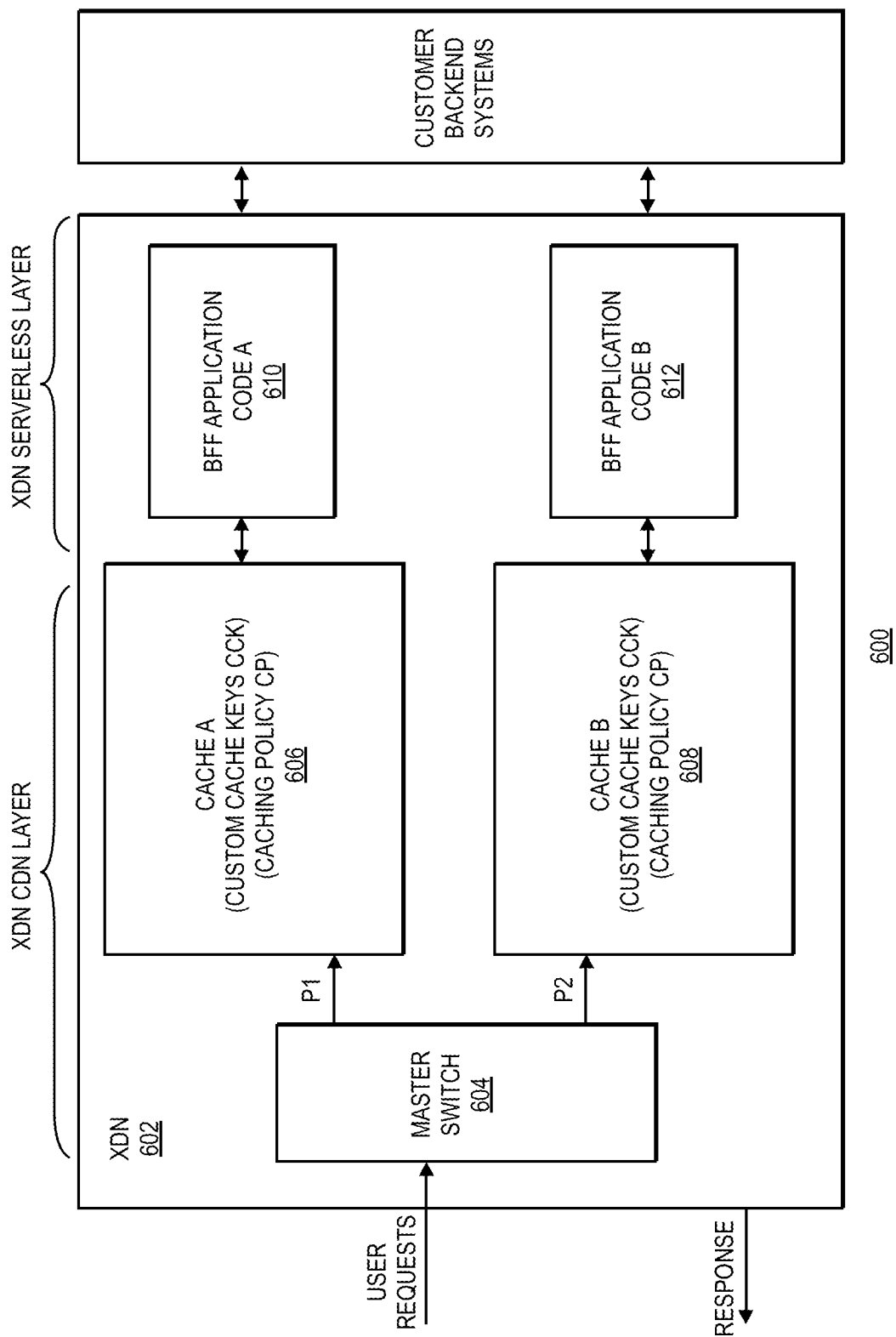
FIG. 6 illustrates a diagram of a caching system, for split testing or for directing traffic according to an embodiment.

Custom cache keys generated using the described embodiments can be used to perform split testing. FIG. 6 illustrates a diagram of a caching system 600, which uses the XDN system 602 at the edge of a computing network for performing split testing (e.g., AB testing) or for generally directing traffic to one or more variants of an application. The XDN system 602 can also be more upstream in a CDN or cloud. Nonetheless, caching and deploying the XDN system 602 at the edge could be more advantageous to optimize speed and performance than deploying these systems upstream. The XDN system 602 can include or interface with one or more customer backend systems (one is shown) to respond to user requests and/or to provide data, content, and/or functionality for the XDN system 602. Various routing criteria from a master switch 604 can be used to split the cache into two or cache policy variants 606, 608. The master switch 604 can receive user requests and randomly determine to which cache variant the requests are routed, for example, based on pre-selected probabilities or percentages, P1, P2, etc. The cache policy variants 606, 608 can be synced with backend for frontend (BFFs) application codes 610, 612. In some embodiments, the cache policy variants 606, 608 can communicate with the same BFF 610 or 612 to obtain the content, data and/or functionality absent in the cache. In other embodiments, the different cache policy variants may communicate with different BFFs.

Referencing FIGS. 2 and 6, the master switch 604 and the cache policy variants 606, 608 can be a part of the XDN CDN layer and the BFF application codes 610, 612 can be a part of the XDN serverless layer. The XDN system 602 can interface with one or more customer backend systems (only one is shown), which can include other serverless, cloud systems or origin servers that house the application source code used to generate the BFF application source codes 610 and 612 in the XDN serverless layer. In some embodiments, the edge layer (e.g., the XDN CDN) can communicate directly with the customer backend systems skipping the application layer (e.g., the XDN serverless) when it is not needed. For example, the edge layer may do this when serving a response that will merely pass through an API or HTML page with little or no change from the customer backend systems.

When the master switch 604 receives a request from a user for the first time, it randomly based on preselected percentages or probabilities assigns the user to a cache variant. A cookie is generated and sent back to the browser, which tells the browser, the assigned cache variant of the user for future requests.

One advantage the described embodiments provide is that cache variants 606, 608 can have different caching policies based on the same set of custom cache keys CCKs which allows the caching system 600 to be used for split testing (e.g., A/B testing) different caching policies. Typically A/B testing is used to test changes in content but this advantage allows A/B testing performance optimization and caching policies themselves.

In some embodiments, the master switch 604 can be optional and the edge logic for cache variant 606 can include code that routes some preselected incoming traffic to the cache variant 608 or other additional cache variants if defined. In general, while the drawings and descriptions of the embodiments may be explained in terms of two cache variants and cache environments, the described technology can be extended to more than two cache environments.

Furthermore, the described embodiments, can be used for split testing and/or for directing traffic to and from a web application or a website. For example, the cache variants 606, 608 can include different cached content, data and/or functionality, where each variant can receive a preselected percentage of the application traffic. The split in traffic can be introduced for various purposes such as testing, marketing or to provide applicable contents based on language, region, currency, browser type, or other criteria as may be selected by the application developer. Advantageously, the ability to selectively direct traffic at the edge based on preselected cache keys is available to an application developer and can be embedded, tested and maintained in the application program code, without having to manually propagate the resulting changes to the CDN or edge computing network providers.

In some embodiments, the CDN-as programming language platform can provide a graphical user interface (GUI) to the operator of the application, by which the operator of the application who may not be a technically savvy individual can manipulate the parameters relevant to directing traffic. When such changes also affect the caching, caching policies and/or CDN behavior previously coded by the application developer, the content delivery network (XDN) can implement the corresponding changes, so the CDN behavior is automatically updated. For example, in some embodiments, the master switch 604 (as a separate component or as an embedded component in one of the cache variants) can accept GUI inputs related to directing traffic at the edge and relevant selected criteria and can direct the application traffic accordingly at the edge. In other words, the developer of the application, through the described embodiments, is empowered to code the CDN behavior, such as caching, as embedded code in the application program code, while a non-technical operator of the application can direct traffic at the edge based on preselected criteria, using a GUI. Advantageously, the actions taken by the operator in the GUI will be coordinated so as to not interfere with the caching defined by the developer. For example, the operator of the application can choose percentages P1, P2, etc. and criteria by which incoming traffic is routed to cache variants 606, 608.

FIG. 7 illustrates an example GUI page available to an operator of the application utilizing the cache system 600 and CDN-as-a programming language. The operator can direct traffic based on various criteria, such as device type, request header, query parameters, path, cookie, IP address, type of browser, bot, or other criteria. In some embodiments, the available criteria (e.g, via drop down menu) are based on custom cache keys as may be defined by the developer of the application, according to the embodiments described herein. Therefore, the operator of the application can add criteria for directing traffic via the GUI.

In one respect, the GUI provides the operator of an application, an interface to define rules of traffic in such a manner that those traffic rules maintain the custom cache keys (CCKs) defined by the developer of the application. The operator can define these rules by choosing from drop down menus, radio buttons or other GUI techniques to specify Boolean logic, priorities and other criteria relevant to directing traffic and the operator's choices will be automatically reflected in the edge logic that implements the CDN behavior, such as caching rules.

Advantageously, the described embodiments allow an application operator to route traffic at the edge traffic using his or her local computer or other device (such as a mobile phone), while preserving the cache keys and the caching behavior, which allow the performance benefits of edge computing and caching, without risking outage or downtime as a result of change in routing, or risking conflicts between caching policy and the routing required to support split testing. When used for split testing, the preserving of the cache keys between the various testing environments (e.g., cache variants), the caching logic and the caching behavior can enable the operator to obtain performant split testing results because the caching behavior of the CDN/edge is preserved via preserved custom cache keys (CCKs) between the different cache variants.

Comparison with Prior Approaches to Directing Traffic and A/B Testing

Existing approaches to A/B testing do not offer the same level of customization and robustness that the described embodiments provide, where an application developer can specify CDN and caching behavior via CDN-as a programming language embedded in the application code and the operator can choose various corresponding criteria of directing traffic at the edge, while the CDN, edge and caching behavior are preserved and/or automatically updated to implement the operator's selections. One existing method of A/B testing includes client-side A/B testing, where the A/B test is executed by the JavaScript that runs on the browser. To implement client-side A/B testing, an A/B testing JavaScript is sent to the client's browser along with a response to a previous user request, and the browser executes code on the client's browser that determines which variant a user is and then modifies the page accordingly. In this approach, the same JavaScript cache content is served to both A and B and the browser changes the content locally based on the received JavaScript A/B code. Possible issues with client-side A/B testing is that the A/B testing code can add additional time to download, and also the test is being performed on the client's browser, which can detrimentally affect performance noticeable by the client.

Another existing approach to A/B testing is to let an upstream server, such as the origin server decide which content to serve. In this scenario, content, data or functionality related to the A/B testing is not cached; instead, the corresponding requests are patched directly through to the upstream server, where the upstream server decides which content to send back in response. Server-side A/B testing can be implemented by introducing a caching policy that states that contents corresponding to requests related to pages or applications under testing are not to be cached. Those requests are then sent to the upstream server, which decides how to split traffic by serving different pages, content, data and application to different users. Consequently, the A/B testing at the server side in this manner causes the pages and applications under testing to lose the performance advantages of CDN, edge computing and caching.

Another potential approach is to write custom caching code (e.g., in VCL or JavaScript depending on the CDN) to implement A/B testing at the edge. However, in this scenario, the developer who writes the caching custom code also has to rewrite or modify the caching logic at the edge to implement the A/B testing. By contrast, in the described embodiments, the operator of the application can select criteria to direct traffic, without having to rewrite, modify or write custom caching code to preserve the caching behavior, while performing A/B testing. The ability for an operator to quickly and efficiently direct traffic, without loss of caching performance can be important in several industries. For example, the operator of an application could be a product manager of an e-commerce website. The manager may have to make decisions about directing traffic on the fly and may need to quickly implement them. For example, she might want to quickly divert 10% of traffic to a new feature that has been performing well. Or she might want to quickly test two versions of a product page to see, which performs better in terms of sales. Based on the results, she might want to ramp up the traffic to one version vs. the other. As these examples demonstrate, it is infeasible, difficult or impractical for an operator to interface with the developer of the website or application to obtain custom code for routing and rerouting the application traffic. Furthermore, even if the operator of the application possesses the technical knowledge to write custom caching CDN caching code for split testing or directing traffic, developing the custom code under the timing constraints of the application may be infeasible, difficult or impractical.

Furthermore, the described embodiments, in particular, the ability to direct traffic via a GUI, as opposed to having to write custom code, free the operator or developer from having to propagate the changes needed every time a new traffic rule is needed. Therefore, the maintenance of a caching system according to the described embodiments is easier compared to existing approaches that utilize custom code. For example, in a CDN-as programming language, a line of code can change the caching policy for a URL and the upstream nodes, servers and service workers are automatically updated, without having to write custom code for each layer of the CDN/edge or cloud.

Figure 8:
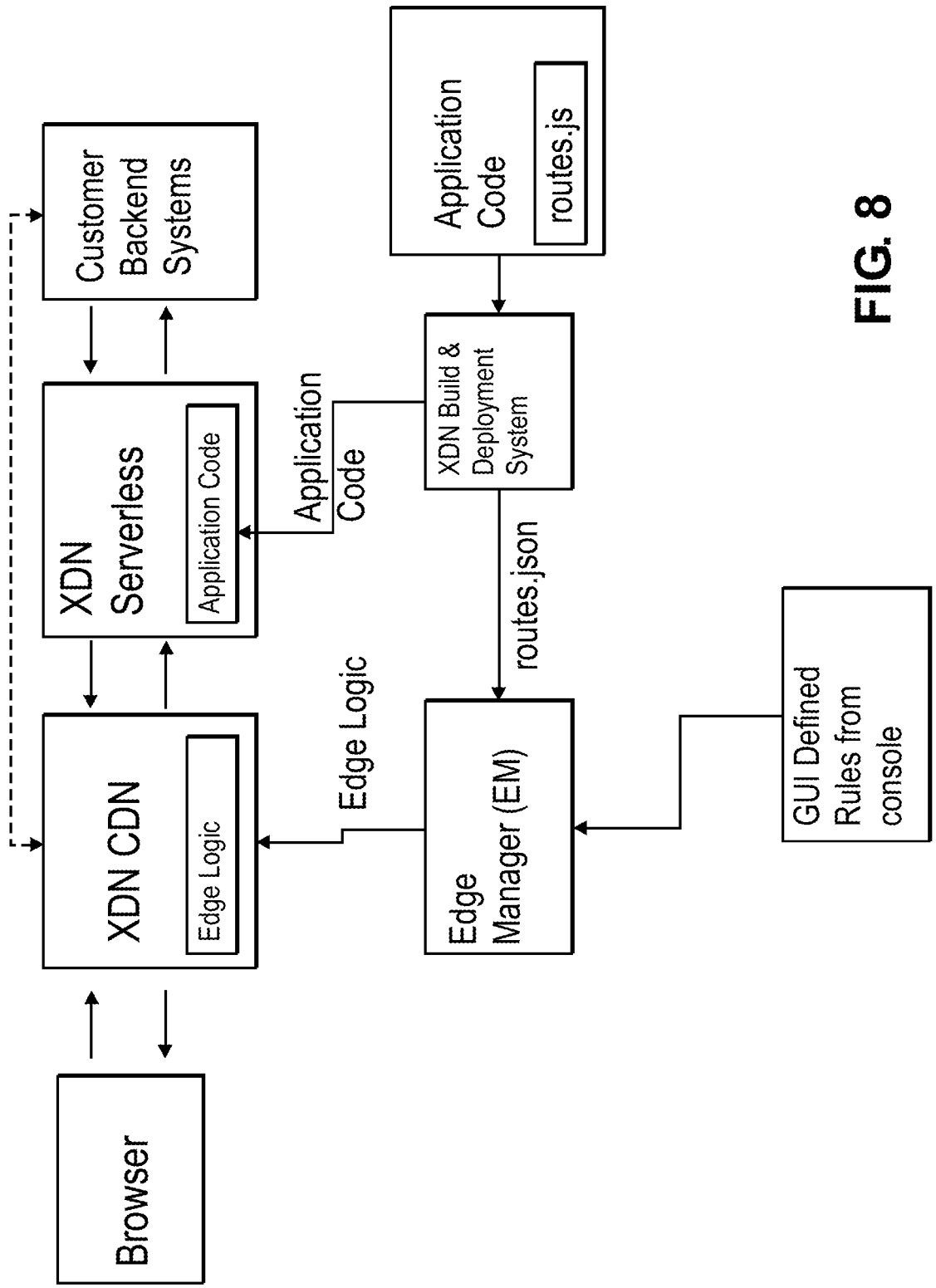
FIG. 8 illustrates a diagram of an alternative embodiment of implementing CDN-as-programming language, when a GUI is used to define traffic rules.

FIG. 8 illustrates a modification of the embodiment of FIG. 2, where the CDN-as a programming language (e.g., CDN as JavaScript) is implemented similar to the embodiment of FIG. 2, but also the CDN behavior is additionally controllable via inputs received from a graphical user interface, as described in relation to the embodiments of FIGS. 6 and 7. In this scenario, GUI defined rules as well as a routes file (such as routes.json) extracted from the application program code. The EM then translates the routes file and the routing files (e.g., routes.json) and the rules from the GUI into edge logic (e.g., via a language the CDN POPs can understand (examples include VCL or JavaScript). The EM translation is in a manner that preserves the custom cache keys (CCKs) and contains instructions compatible with the CDN and according to the routing rules received from the GUI. In some embodiments, the edge logic deployed to the XDN CDN layer and the application code deployed to the XDN serverless layer are atomically deployed at the same time.

In the embodiments, where the CDN can be compatible with the application programming code, without the need for translation from EM, the EM can be omitted. In this scenario, the Build and Deployment system can receive the GUI defined rules and deploy them to the content delivery network (e.g., XDN CDN) in a manner that the routing rules executed by the CDN preserve the cache keys and the traffic splitting rules define by GUI rules. The XDN CDN can in turn deploy the application code and the traffic splitting and routing rules to additional layers, such as other CDN nodes/layers or serverless.

In the embodiment of FIG. 8, the EM or the Build and Deployment system, receive GUI inputs and construct a master routing file that preserves the cache keys defined by the developer in the application program code, while implementing the traffic splitting and routing rules selected by the operator of the application. The edge logic sent to the CDN is in a language compatible with the underlying CDN and additional layers in the distribution of the application. However, persons of ordinary skill in the art recognize that the rest of the described technology (e.g., non-edge logic) is not limited to the language used in the CDN.

Atomic Deployment of Application Code, Caching and Edge Logic to Different Layers The challenge faced when trying to configure edge behavior (e.g., by defining cache policies) is that the changes introduced in the application code or edge behavior may have to be manually propagated through the various distribution layers of the application. the edge layer logic, The described embodiments, enable atomic deployments of the application code (and embedded caching policies) to various distribution layers of the application. For example, referencing the embodiment of FIG. 6, The BFF application code 610 is coupled and synced with its corresponding caching policy variant 606 and edge logic (not shown) corresponding to the cache variant 606. When deployed, the BFF application code 610 is deployed to the XDN serverless layer and the cache policy 606 (and its corresponding edge logic) are deployed to the XDN CDN layer or equivalent and relevant layer in the distribution network of the application. However, both deployments, while to different layers are in sync in terms of using the same cache policy, same cache keys and same edge logic. In this manner, changes to the BFF application code 610 is automatically propagated to its cache policy and edge logic deployed to the XDN CDN layer or other relevant layers of the distribution network of the application. When split testing and variant testing is used (e.g., by defining a second variant of the application via BFF application code 612), the same atomic and in sync deployment applies to that variant and its corresponding cache policy. In this manner, changes in the BFF application code 612 (and or the caching policy embedded therein) is automatically propagated to its corresponding cache policy variant 608 and its edge logic. When deployed, the BFF application code 612 is deployed to the XDN serverless layer, while an in sync and updated corresponding cache policy variant 608 and its corresponding edge logic is deployed to the XDN CDN layer. In this manner, the developer can change the BFF application code 610 or 612 and her changes are automatically propagated through the relevant distribution layers.

At the same time, the edge logic serving requests/responses, can maintain the cache policy variants separately and serve those requests/responses with the corresponding proper variant environment. For example, the edge logic can be configured to determine if a request is related to the variant A (defined by cache policy variant 606 and the corresponding application code 610). The edge layer will subsequently serve that request in the environment defined by 606, 610, separate and unaffected by the environment B defined by another application code and caching policy variant (e.g., 608/612). This can be accomplished by configuring a master edge logic executed by the edge layer to include edge logic submodules corresponding to each environment. For example, in the case of a two-environment caching system as shown in FIG. 6, the master edge logic can include an edge logic submodule A and an edge logic submodule B, corresponding to application codes 610 and 612, respectively. In this scenario, when serving requests/responses, the master edge logic will serve the requests/responses by recalling or handing off the serving of the request/response to the corresponding edge logic submodule generated from the corresponding application code. One method by which this can be implemented includes embedding an identifier in the edge logic submodule that the edge logic submodule passes along as metadata in its requests to the application execution layer. The application execution layer will then recognize the identifier and route the request to only that variant of the application code. In this manner, the edge logic submodule is bound to the application code it was generated from and will not serve requests/responses for other variants of the application code.

Returning to the embodiment of FIG. 8, the operations that implement this atomic deployment of application code and edge logic corresponding to the application code and cache policies defined therein, are shown. The XDN build and deployment system and the EM work in unison to translate an application code to the language of a corresponding layer, in a manner that maintains compatibility between the layers when deployed. For example, the XDN build and deployment system deploys the application code to the XDN serverless or other relevant layers in the distribution network of the application. The EM translates cache policies and the edge logic corresponding to the application code and deploys the edge logic to the XDN CDN layer, having retained the cache policies and edge logic defined by the application code. Consequently, when deployed, the application code on one layer of the distribution network (e.g., the XDN serverless) is compatible with and can work seamlessly with the edge logic on another distribution layer (e.g., the XDN CDN).

As described earlier, the embodiments enable traffic routing systems and methods to various computing environments (e.g., those defined by different cache policies). The master switch 604 can obtain the criteria for routing traffic. The received criteria can become another parameter in the translation and atomic deployment of the application code to various distribution layers.

Implicit and Explicit Caching Policy and Routing

In some embodiments, at least some of the edge logic and behavior is implicitly specified by the framework the developer has chosen, and the system functions to extract those behaviors. An application framework is a software framework which automates at least some of the overhead associated with common activities performed in web development. The application framework deploys or executes the application in such a way that the flow of control is not dictated by the caller of the application, but by the framework itself. In some embodiments, the framework in combination with the application code defines the routes within an application, and exerts some influence on edge behavior. The application code does not define the routes within the application, and neither does the developer who wrote the application code. Rather, in some embodiments, the application framework defines behaviors and the system determines the routes within the application based on these behaviors. In some embodiments, the system will allow a developer to specify one or more behaviors to occur in the application code, where the behaviors are implicitly defined within the application framework. The system then automates as much of these behaviors as possible based on the definitions within the specified application framework.

In some embodiments, the system (e.g., the XDN) may be configured to analyze caching and routing behavior defined within the application framework, and analyze the application code in the context of those defined behaviors. The system can then use that analysis to automatically configure the edge based on the caching and routing behaviors defined in the application framework. In some embodiments, the system may configure as such to automatically take routes, analyze and understand the context of the routes, and automatically propagate them to the edge server within a single line. For example, in a "routes.js" file, ".use(NextRoutes)" may be used within a single line to propagate a route to the edge server based on the caching and routing behaviors defined in the Next application framework. The "use" statement analyzes the routing and caching logic statements within the application framework and/or application code, and implicitly understands the routing and caching that are the consequence of the application code and the framework. Additionally, this allows the developer to specify routing and caching using the routes of their application framework. The system then populates the edge logic to match the behavior of the application server when running the application code with the chosen application framework. Thus, if some aspect of the application calls those statements, the system will automatically analyze and propagate them. In some embodiments, the developer can explicitly add one or more commands for edge logic beyond what is specified by the application code or the application framework. For example, a developer may specify fallback or migration commands for the edge.

Examples of routing logic may include, for example: sending proxy requests to upstream sites; sending redirects from the network edge; rendering responses on the server using an application framework; altering requests and response headers; sending synthetic responses; or any other suitable routing logic. In some embodiments, routes may be declared using a method corresponding to an HTTP method the developer wishes to match. HTTP methods may include, e.g., get, put, post, patch, delete, or head. In some embodiments, a request may match multiple statements in the routing logic. For example, a common pattern involves matching a request to specify it's caching behavior and having a separate routing statement that dictates the rendering for that route. Another common pattern may involve utilizing the value or presence of certain headers or cookies in the routing and caching decisions.

Method of Directing Traffic

Accordingly, the described embodiments can be used to direct and/or control the flow of traffic to a web application. The flow of traffic can include the receipt and handling of user requests and responses to user requests to and from upstream systems, such as an edge layer, an application execution layer, a serverless layer, a backend system, etc. In particular, the described embodiments can be used to configure an edge network, an edge computing network and/or an edge layer within a distribution layer of a web application.

In some embodiments, a plurality of source codes of a web application can be received from a backend system. The plurality of the source codes can include backend for frontend (BFF) source code, which can define the behavior of the frontend of the web application and the frontend/backend interaction configurations. The BFF source codes can each include routing rules and cache policies of one or more variants of the web application. The variants of the web application may have been designed by the developer of the web application to test the different variants or to generally direct traffic to the web application to the variants based on some technical, marketing or other criteria. Furthermore, the BFF source codes when deployed to an application execution layer (e.g., the XDN serverless layer) configure the execution layer to execute the variant of the web application defined in the source code. As described earlier, the source code, including for example, the BFF application code can include routing rules cache policies of the variant defined in the source code.

Referring to FIGS. 6 and 8, the XDN system 602 can receive the application source code and generate a corresponding edge logic for the source code. The edge logic when deployed to the edge layer (e.g., a CDN layer, such as XDN CDN layer) can configure the edge layer to execute the operations of the edge layer in a manner that is consistent with or compatible with the routing rules and cache policies defined in the source code. The edge layer can execute its operations based on the configurations defined in one or more master edge logic files. When multiple source codes that correspond to different variants of the web application are used, the XDN system can generate edge logic specific to each source code and the underlying routing rules and cache policy in the corresponding application variant. In this manner, the routing rules and caching behavior of the variants are kept separate and do not interfere with one another. For example, when the edge layer receives traffic related to one variant, the edge layer executes the routing rules and caching policy and/or operations related to that variant. At the same time if another user request related to a different variant is received the edge layer executes the routing rules, and cache policy of the related variant. In other words, for each variant, the edge layer can execute a corresponding edge logic file.

The edge layer can also receive other criteria for directing traffic as described in relation to the embodiments of FIGS. 6-8. The additional criteria can be received along with an amount of traffic corresponding to each criteria. These can define routing instructions executable by the edge layer. In such embodiments, where additional criteria and amount of traffic is defined (e.g., via a GUI), the edge layer can be configured (e.g., by modifying its master edge logic file) to implement or otherwise execute the routing instructions. In some embodiments, the additional criteria and selected amount of traffic are converted into a plurality of routing instructions at the edge layer, where the routing instructions preserve the caching policy defined in the variants of the web application. Referring to FIGS. 6 and 8, the source code related to each variant can be deployed to an execution layer (e.g., the XDN serverless) and the master logic file, modified with routing instructions from the additional criteria and selected amount of traffic, can be deployed to the edge layer for execution.

In this manner, the edge layer can be configured with a plurality of edge logic codes, which in turn configure the edge layer to use the routing rules and the relevant caching policy of corresponding source codes. Referring to FIG. 6, such configuration, allows the edge to handle traffic in a manner that the different variants (caching policies and routing rules) are consistent, compatible, and segregated, so as to not interfere with one another. Consequently, the edge layer can receive the traffic at the edge and route it, according to the master edge logic and the routing instructions defined therein, to the appropriate application variant, and caching behavior.

Figure 9A:
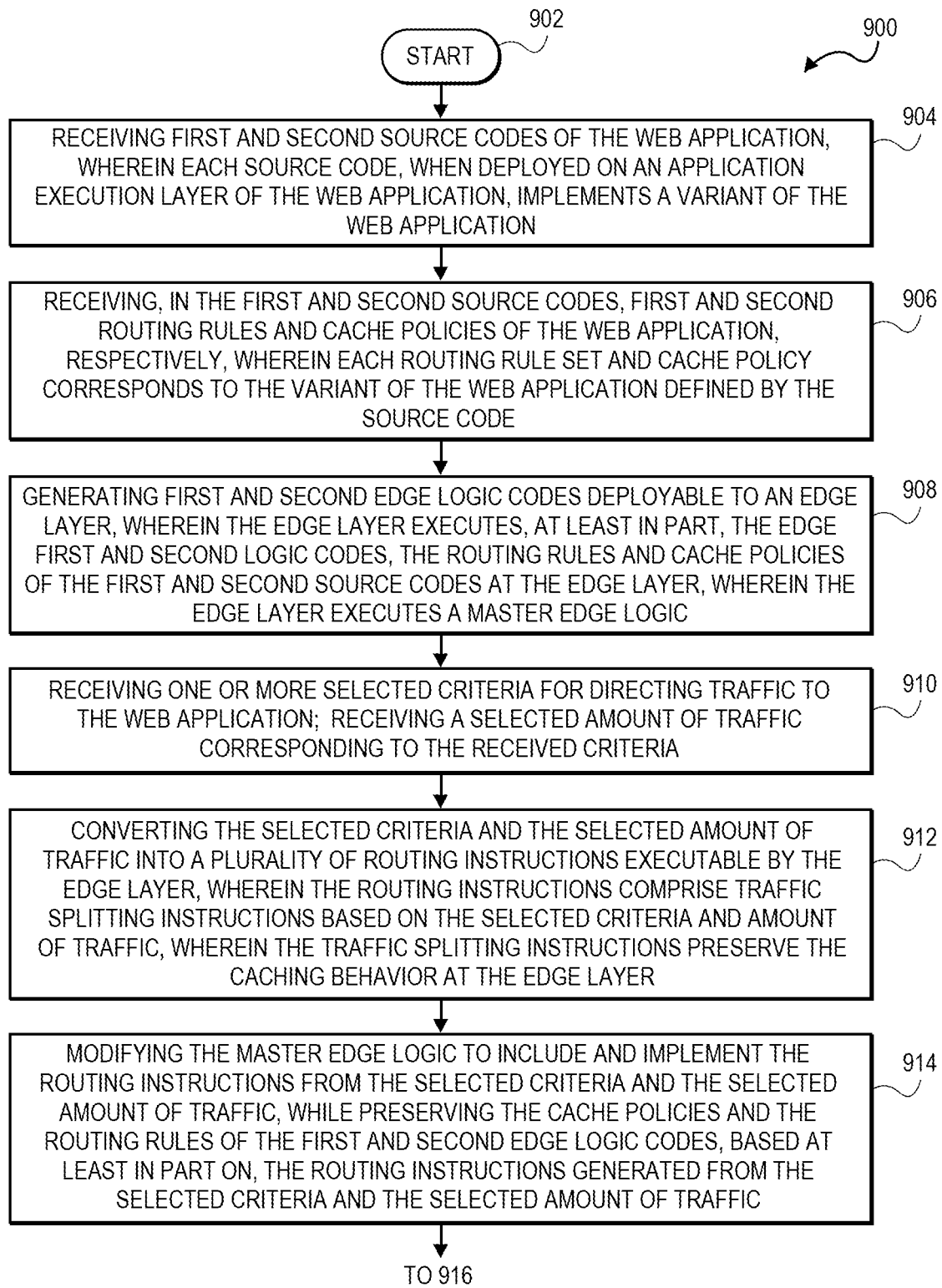
FIGS. 9A and 9B illustrate a flowchart of a method for directing traffic from a web application at the edge of a computing network, according to an embodiment.
Figure 9B:
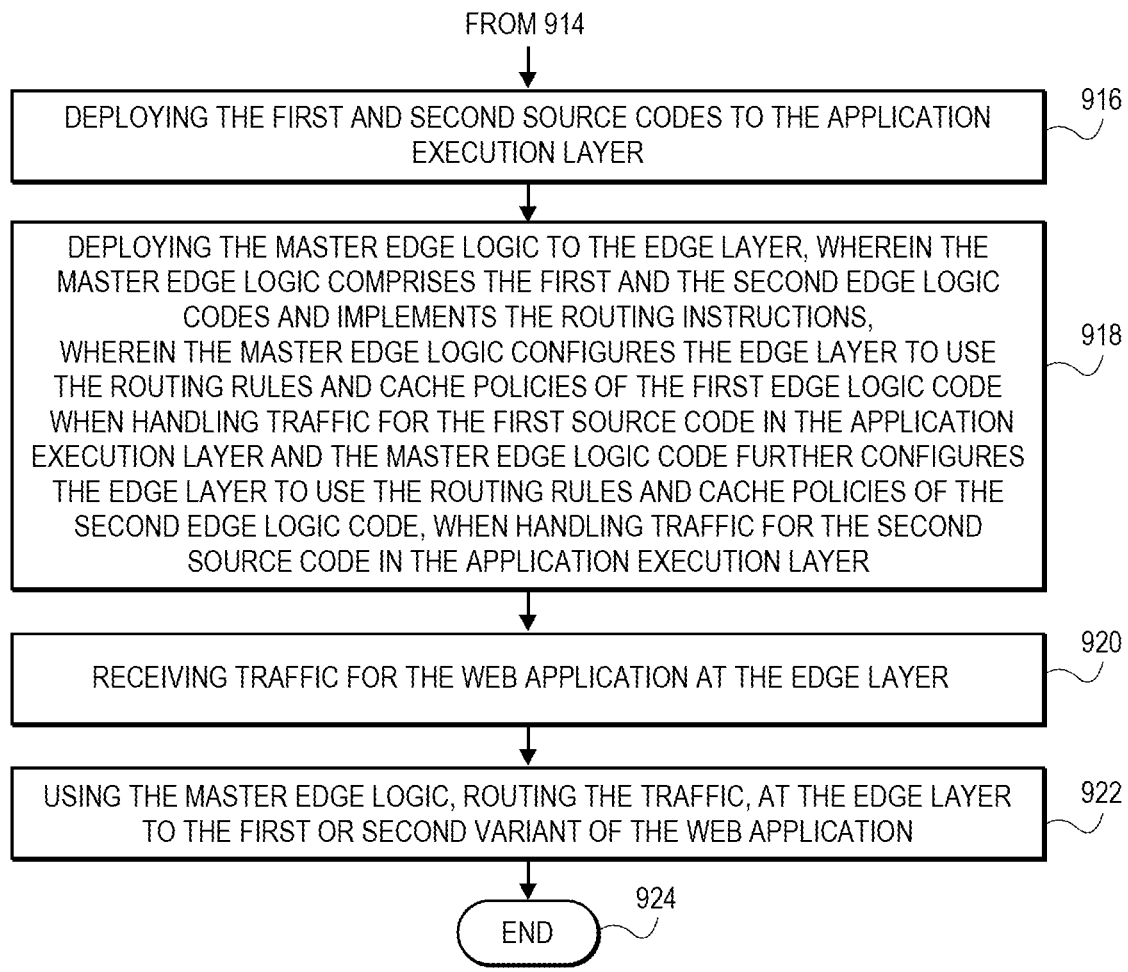

FIGS. 9A-9B illustrate a flowchart of a method 900 of directing traffic of a web application, in an edge computing network to one or more variants of the web application at the edge of the computing network. The method starts at step 902. At step 904, the method includes receiving first and second source codes of the web application, wherein each source code, when deployed on an application execution layer of the web application, implements a variant of the web application. At step 906, the method includes receiving, in the first and second source codes, first and second routing rules and cache policies of the web application, respectively, wherein each routing rule set and cache policy corresponds to the variant of the web application defined by the source code. At step 908, the method includes generating first and second edge logic codes deployable to an edge layer, wherein the edge layer executes, at least in part, the edge first and second logic codes, the routing rules and cache policies of the first and second source codes at the edge layer, wherein the edge layer executes a master edge logic.

At step 910, the method includes receiving one or more selected criteria for directing traffic to the web application and receiving a selected amount of traffic corresponding to the received criteria. At step 912, the method includes converting the selected criteria and the selected amount of traffic into a plurality of routing instructions executable by the edge layer, wherein the routing instructions comprise traffic splitting instructions based on the selected criteria and amount of traffic, wherein the traffic splitting instructions preserve the caching behavior at the edge layer.

At step 914, the method includes modifying the master edge logic to include and implement the routing instructions from the selected criteria and the selected amount of traffic, while preserving the cache policies and the routing rules of the first and second edge logic codes, based at least in part on, the routing instructions generated from the selected criteria and the selected amount of traffic. At step 916, the method includes deploying the first and second source codes to the application execution layer. At step 918, the method includes deploying the master edge logic to the edge layer, wherein the master edge logic comprises the first and the second edge logic codes and implements the routing instructions, wherein the master edge logic configures the edge layer to use the routing rules and cache policies of the first edge logic code when handling traffic for the first source code in the application execution layer and the master edge logic code further configures the edge layer to use the routing rules and cache policies of the second edge logic code, when handling traffic for the second source code in the application execution layer.

At step 920, the method includes receiving traffic for the web application at the edge layer. At step 922, the method includes using the master edge logic, to route the traffic, at the edge layer to the first or second variant of the web application. The method ends at step 924.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
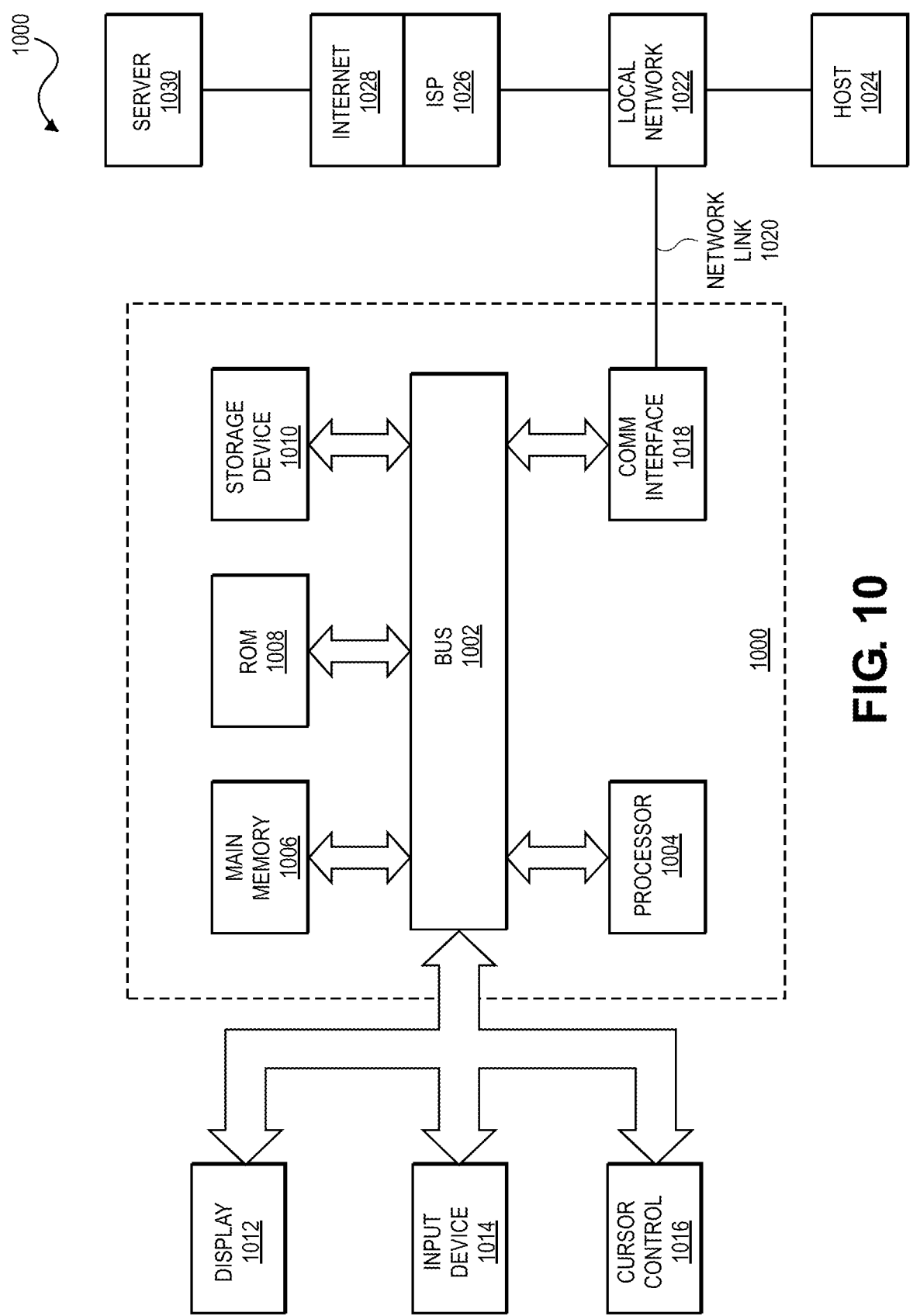
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method for directing traffic of a web application, in an edge computing network to one or more variants of the web application at the edge computing network, the method comprising:
   receiving first and second source codes of the web application, wherein the first source code and second source code, when deployed on an application execution layer of the web application, respectively implement a first variant and a second variant of the web application, wherein receiving the first source, code comprises receiving first routing rules and cache policies corresponding to the first variant of the web application, and wherein receiving the second source code comprises receiving second routing rules and cache policies corresponding to the second variant of the web application;

generating first and second edge logic codes deployable to an edge layer, wherein the edge layer executes, at least in part, the first and second edge logic codes, the first and second routing rules and cache policies of the first and second source codes at the edge layer, wherein the edge layer executes a master edge logic;

receiving one or more selected criteria for directing traffic to the web application;

receiving a selected amount of traffic corresponding to the selected criteria;

converting the one or more selected criteria and the selected amount of traffic into a plurality of routing instructions executable by the edge layer, wherein the plurality of routing instructions comprise traffic splitting instructions based on the one or more selected criteria and the selected amount of traffic, wherein the traffic splitting instructions preserve caching behavior at the edge layer;

modifying the master edge logic to include and implement the plurality of routing instructions from the one or more selected criteria and the selected amount of traffic, while preserving the cache policies and the routing rules of the first and second edge logic codes, wherein modifying the master edge logic is based at least in part on the plurality of routing instructions generated from the one or more selected criteria and the selected amount of traffic;

deploying the first and second source codes to the application execution layer;

deploying the master edge logic to the edge layer, wherein the master edge logic comprises the first and the second edge logic codes and implements the routing instructions, wherein the master edge logic configures the edge layer to use the routing rules and cache policies of the first edge logic code when handling traffic for the first source code in the application execution layer and the master edge logic code further configures the edge layer to use the routing rules and cache policies of the second edge logic code, when handling traffic for the second source code in the application execution layer;

receiving traffic for the web application at the edge layer; and using the master edge logic, routing the traffic, at the edge layer to the first or second variant of the web application.

2. The method of claim 1, wherein the one or more selected criteria and the selected amount of traffic are received via a graphical user interface.

3. The method of claim 1, wherein the cache policies are generated based on a plurality of cache keys, wherein the plurality of cache keys are generated based on a URL and metadata of a request in the received traffic at the edge.

4. The method of claim 3, wherein the metadata comprises one or more cookies received in the request.

5. The method of claim 3, wherein the metadata comprises a part of or an entirety of one or more HTTP header values.

6. The method of claim 3, further comprising:
receiving caching instructions in the first and/or second source codes, comprising filtering criteria;
generating cache keys based on the filtering criteria;
filtering the request based on the filtering criteria; and
determining matching one or more matching cache keys to the filtered request.

7. The method of claim 6, wherein filtering the request comprises filtering query parameters of a URL embedded in the request.

8. The method of claim 1, wherein converting the one or more selected criteria and the selected amount of traffic into a plurality of routing instructions, comprises extracting one or more routing files from the first and second source codes of the web application and wherein converting further comprises generating the plurality of routing instructions, based, at least in part, on the extracted routing files from the first and second source codes.

9. The method of claim 1, wherein the first and second edge logic codes configure one or more cache storages to be searchable by a plurality of cache keys.

10. The method of claim 1, wherein the edge layer is configured to send a request to the application execution layer, wherein an identifier is embedded within the request wherein the identifier comprises an indication of an edge logic variant handling the request and wherein the identifier further indicates a corresponding application code variant in the application execution layer to serve a response to that request.

11. The method of claim 1, wherein the first and the second edge logic codes and the corresponding first and second source codes are synced, such that changes in the source codes are automatically deployed to the corresponding application execution and edge layers.

12. Non-transitory computer storage for directing traffic of a web application, in an edge computing network to one or more variants of the web application at the edge computing network, the non-transitory computer storage storing executable program instructions that, when executed by one or more computing devices, configure the one or more computing devices to perform operations comprising:

receiving first and second source codes of the web application, wherein the first source code and second source code, when deployed on an application execution layer of the web application, respectively implement a first variant and a second variant of the web application, wherein receiving the first source code comprises receiving first routing rules and cache policies corresponding to the first variant of the web application, and wherein receiving the second source code comprises receiving second routing rules and cache policies corresponding to the second variant of the web application;

generating first and second edge logic codes deployable to an edge layer, wherein the edge layer executes, at least in part, the first and second edge logic codes, the first and second routing rules and cache policies of the first and second source codes at the edge layer, wherein the edge layer executes a master edge logic;

receiving one or more selected criteria for directing traffic to the web application;

receiving a selected amount of traffic corresponding to the selected criteria;

converting the one or more selected criteria and the selected amount of traffic into a plurality of routing instructions executable by the edge layer, wherein the plurality of routing instructions comprise traffic splitting instructions based on the one or more selected criteria and the selected amount of traffic, wherein the traffic splitting instructions preserve a caching behavior at the edge layer;

modifying the master edge logic to include and implement the plurality of routing instructions from the one or more selected criteria and the selected amount of traffic, while preserving the cache policies and the routing rules of the first and second edge logic codes, wherein modifying the master edge logic is based at least in part on the plurality of routing instructions generated from the one or more selected criteria and the selected amount of traffic;

deploying the first and second source codes to the application execution layer;

deploying the master edge logic to the edge layer, wherein the master edge logic comprises the first and the second edge logic codes and implements the plurality of routing instructions, wherein the master edge logic configures the edge layer to use the routing rules and cache policies of the first edge logic code when handling traffic for the first source code in the application execution layer and the master edge logic code further configures the edge layer to use the routing rules and cache policies of the second edge logic code, when handling traffic for the second source code in the application execution layer;

receiving traffic for the web application at the edge layer; and using the master edge logic, routing the traffic, at the edge layer to the first or second variant of the web application.

13. The non-transitory computer storage of claim 12, wherein the one or more selected criteria and the selected amount of traffic are received via a graphical user interface.

14. The non-transitory computer storage of claim 12, wherein the cache policies are generated based on a plurality of cache keys, wherein the plurality of cache keys are generated based on a URL and metadata of a request in the received traffic at the edge.

15. The non-transitory computer storage of claim 14, wherein the metadata comprises one or more cookies received in the request.

16. The non-transitory computer storage of claim 14, wherein the metadata comprises a part of or an entirety of one or more HTTP header values.

17. The non-transitory computer storage of claim 14, wherein the operations further comprise:
receiving caching instructions in the first and/or second source codes, comprising filtering criteria;
generating cache keys based on the filtering criteria;
filtering the request based on the filtering criteria; and
determining matching one or more matching cache keys to the filtered request.

18. The non-transitory computer storage of claim 17, wherein filtering the request comprises filtering query parameters of a URL embedded in the request.

19. The non-transitory computer storage of claim 12, wherein converting the one or more selected criteria and the selected amount of traffic into a plurality of routing instructions, comprises extracting one or more routing files from the first and second source codes of the web application and wherein converting further comprises generating the plurality of routing instructions, based, at least in part, on the extracted routing files from the first and second source codes.

20. The non-transitory computer storage of claim 12, wherein the edge layer is configured to send a request to the application execution layer, wherein an identifier is embedded within the request wherein the identifier comprises an indication of an edge logic variant handling the request and wherein the identifier further indicates a corresponding application code variant in the application execution layer to serve a response to that request.

* * * * *